US008831528B2

(12) United States Patent
Shi

(10) Patent No.: US 8,831,528 B2
(45) Date of Patent: Sep. 9, 2014

(54) SAR CONTROL USING CAPACITIVE SENSOR AND TRANSMISSION DUTY CYCLE CONTROL IN A WIRELESS DEVICE

(75) Inventor: Ping Shi, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 242 days.

(21) Appl. No.: 13/343,281

(22) Filed: Jan. 4, 2012

(65) Prior Publication Data
US 2013/0169348 A1 Jul. 4, 2013

(51) Int. Cl.
*H04B 17/00* (2006.01)
*H04M 1/00* (2006.01)

(52) U.S. Cl.
USPC .................. 455/67.11; 455/575.5; 455/575.6; 455/575.7

(58) Field of Classification Search
CPC ............... H04W 52/0254; H04W 52/0251; H04W 52/0209; H04W 52/0274; H04W 52/0206; H04W 52/0261; H04W 52/0229; H04W 52/0245; H04W 52/02; H04W 52/0225; H04W 52/0241; H04W 52/0258; H04W 52/0216; H04W 52/0248
USPC ........................ 455/550.1, 575.7, 575.5, 575.6
See application file for complete search history.

(56) References Cited

U.S. PATENT DOCUMENTS

| | | | |
|---|---|---|---|
| 6,204,839 B1 | 3/2001 | Mato, Jr. | |
| 8,077,032 B1 | 12/2011 | Vier et al. | |
| 8,326,385 B2 * | 12/2012 | Brogle et al. | 455/575.7 |
| 8,406,806 B2 * | 3/2013 | Wong | 455/550.1 |
| 8,538,365 B2 * | 9/2013 | Croman et al. | 455/310 |
| 8,554,259 B2 * | 10/2013 | Ramasamy et al. | 455/522 |
| 2002/0167930 A1 | 11/2002 | Pearl | |
| 2003/0064761 A1 | 4/2003 | Nevermann | |
| 2011/0034135 A1 | 2/2011 | Ali et al. | |
| 2011/0102293 A1 * | 5/2011 | Chen et al. | 343/876 |
| 2011/0199921 A1 * | 8/2011 | Damnjanovic et al. | 370/252 |
| 2011/0222469 A1 | 9/2011 | Ali et al. | |
| 2014/0051348 A1 * | 2/2014 | Chow et al. | 455/7 |
| 2014/0155000 A1 * | 6/2014 | Erkens | 455/73 |

FOREIGN PATENT DOCUMENTS

EP 1298809 A2 4/2003
WO 2011111049 A1 9/2011

OTHER PUBLICATIONS

Foreign Communication from a Counterpart Application, PCT Application PCT/US2013/020105, International Search Report dated Apr. 2, 2013, 5 pages.
Foreign Communication from a Counterpart Application, PCT Application PCT/US2013/020105, Written Opinion dated Apr. 2, 2013, 7 pages.

(Continued)

*Primary Examiner* — Sonny Trinh
*Assistant Examiner* — Maryam Soltanzadeh
(74) *Attorney, Agent, or Firm* — Conley Rose, P.C.; Grant Rodolph; Nicholas K. Beaulieu

(57) ABSTRACT

A wireless device for providing specific absorption rate (SAR) control comprising a wireless transmitter, a capacitance sensor, and a processor coupled to the wireless transmitter and the capacitance sensor, wherein the processor is configured to receive a first capacitance measurement from the capacitance sensor, estimate a relative proximity of a human body to the apparatus based on the measurement, determine a target transmission time for the wireless transmitter within a time period based on the estimate, and switch off the wireless transmitter for a portion of the time period if a transmission time of the wireless transmitter during the time period exceeds the target transmission time.

16 Claims, 8 Drawing Sheets

(56) References Cited

OTHER PUBLICATIONS

"Agilent EEsof EDA, Interdigital Capacitor Design," Agilent Technologies, www.agilent.com/find/eesof, 2008, 10 pages.

Grothe, "AD7150 On-Chip Noise Filter," AN-1048 Application Note, Analog Devices, 2009, 2 pages.

"AD7150 Capacitance Converter for Proximity Sensing," Analog Devices, www.analog,com/cdc, 2008, 2 pages.

"Fundamental of Electrostatic Discharge—Part Five—Device Sensitivity and Testing," ESD Association, Rome, NY, 2010, 7 pages.

Pratt, "Capacitance Sensors for Human Interfaces to Electronic Equipment," Ask the Engineer, Analog Dialogue vol. 40 No. 4, Oct. 2006, pp. 6-8.

"IEEE Standard for Safety Levels with Respect to Human Exposure to Radio Frequency Electromagnetic Fields, 3kHz to 300 GHz," IEEE International Committee on Electromagnetic Safety (SCC39), IEEE Standard C95.1-2005, Apr. 19, 2006, 250 pages.

"IEEE Recommended Practice for Measurements and Computations of Radio Frequency Electromagnetic Fields with Respect to Human Exposure to Such Fields, 100 kHz-300 GHz," IEEE International Committee on Electromagnetic Safety, IEEE-SA Stanrds Board, IEEE Standard C95.3-2002 (R2008), Jun. 12, 2008, 133 pages.

\* cited by examiner ed in the following description with reference to an exemplary system to the wireless device, identify a first one of a plurality of proximity regions within which the human body is located based on the first capacitance value and the second capacitance value, monitor a transmit time of the wireless transmitter during a time period, and prohibit transmission by the wireless transmitter during a portion of the time period if the transmit time exceeds a target transmit time, wherein a transmit time exceeding the target transmit time does not satisfy one or more SAR compliance criteria for humans located in the first proximity region.

These and other features will be more clearly understood from the following detailed description taken in conjunction with the accompanying drawings and claims.

US 8,831,528 B2

SAR CONTROL USING CAPACITIVE SENSOR AND TRANSMISSION DUTY CYCLE CONTROL IN A WIRELESS DEVICE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Advances in wireless communication technology have yielded a variety of wireless devices that are available at decreasing cost and increasing capability. One characteristic of wireless devices, such as universal serial bus (USB) datacards, wireless routers, tablets, electronic readers, or cell phones, including smart phones, is that they may use radio frequency (RF) communication signals, which may include electromagnetic waves in the frequency range of about three kilohertz (kHz) to about 300 Gigahertz (GHz), to communicate with other wireless devices. However, RF signals may be harmful to humans at sufficient exposures. Consequently, the Federal Communications Commission (FCC) has regulated the RF energy output of various wireless devices to limit the general public's exposure to RF energy. Some of the FCC's regulations and/or compliance standards may be outlined in Institute of Electrical and Electronics Engineers (IEEE)/American National Standards Institute (ANSI) publication C95.1-2005 entitled "IEEE Standard for Safety Levels with Respect to Human Exposure to Radio Frequency Electromagnetic Fields, 3 khz to 300 GHz" and IEEE C95.3-2002 entitled "IEEE Recommended Practice for Measurements and Computations of Radio Frequency Electromagnetic Fields with Respect to Human Exposure to Such Fields, 100 kHz-300 GHz," both of which are incorporated by reference herein as if reproduced in their entirety. Specifically, the various regulations specify maximum Specific Absorption Rates (SAR) for RF devices based on a variety of factors, where SAR may be considered as the rate of RF energy absorption per unit mass at a point in an absorbing body. Compliance with these regulations may be mandatory in order to introduce a wireless device into the marketplace. Thus, it is desirable to meet the various SAR requirements and to otherwise reduce SAR where possible in order to ensure user safety. It is also desirable to use systems and methods for meeting SAR requirements that simplify development and reduce cost and development time.

SUMMARY

In one aspect, the invention includes a wireless device for providing SAR control comprising a wireless transmitter, a capacitance sensor, and a processor coupled to the wireless transmitter and the capacitance sensor, wherein the processor is configured to receive a first capacitance measurement from the capacitance sensor, estimate a relative proximity of a human body to the apparatus based on the measurement, determine a target transmission time for the wireless transmitter within a time period based on the estimate, and switch off the wireless transmitter for a portion of the time period if a transmission time of the wireless transmitter during the time period exceeds the target transmission time.

In another aspect, the invention includes a method for providing SAR control comprising receiving a first capacitance measurement of a first capacitor from a capacitance sensor, wherein the capacitance sensor is coupled to a wireless device, and wherein the wireless device comprises a wireless transmitter, estimating a relative proximity of a human body to the wireless device based on the measurement, determining a target transmission time for the wireless transmitter within a time period based on the estimate, and switching off the wireless transmitter for a portion of the time period if a transmission time of the wireless transmitter during the time period exceeds the target transmission time.

In yet another aspect, the invention includes a wireless device comprising a wireless transmitter, a capacitance sensor configured to measure a first capacitance value and a second capacitance value, and a processor coupled to the wireless transmitter and the capacitance sensor, wherein the processor is configured to determine that a human body is proximately located

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
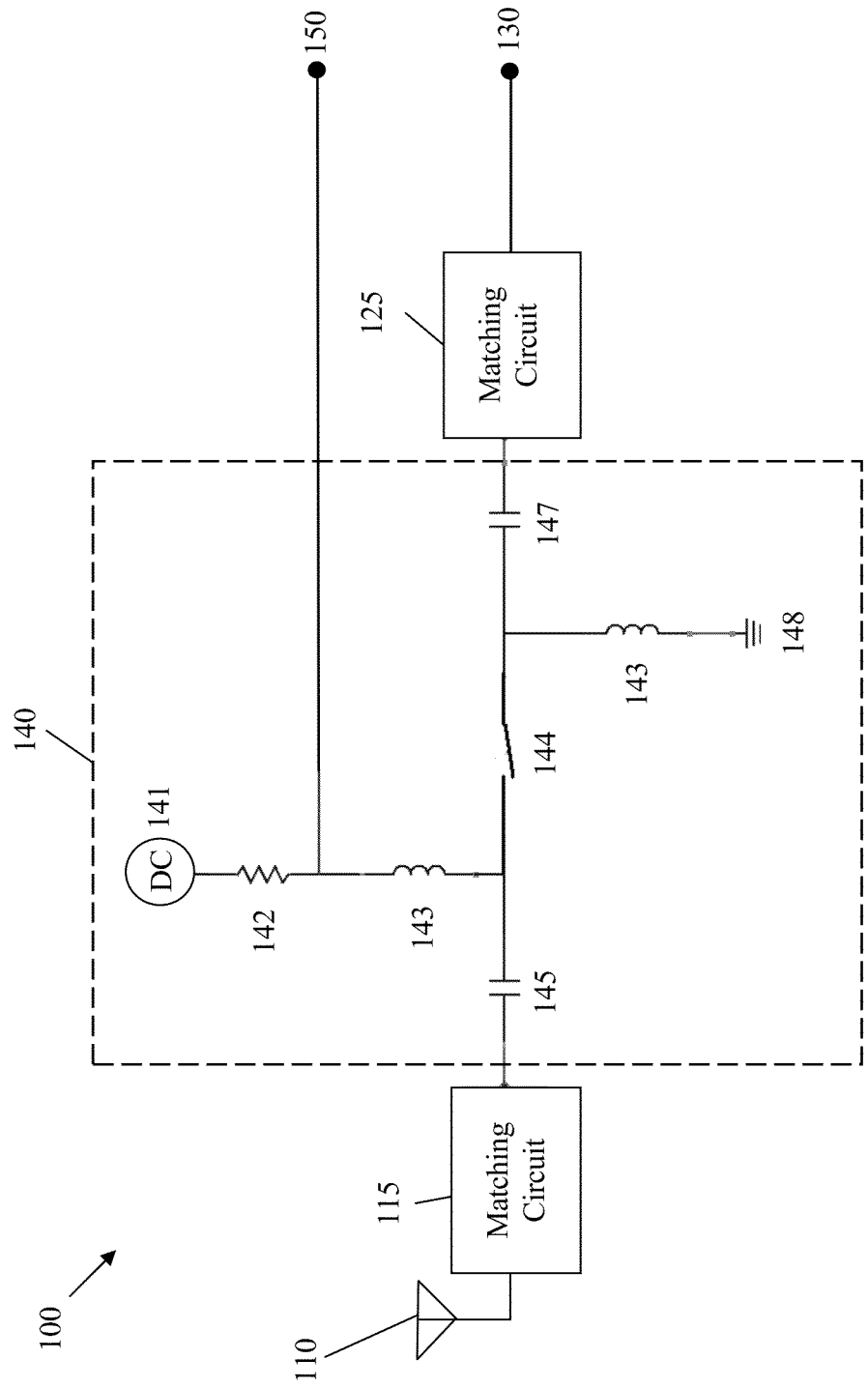
FIG. 1 is a schematic diagram an embodiment of part of an RF transceiver circuit.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

SAR values experienced by a user of a wireless device may be related to transmission power of the wireless device, transmission duty cycle, and distance between the wireless device and user, as well as other factors, such as antenna design and shielding. (The term "transmission duty cycle" or simply "duty cycle" may refer to a fraction of time that an antenna of a wireless device transmits, as measured in a period of time or time period. Thus, a duty cycle may be any percentage from 0% to 100%, inclusive.) For example, the amount of RF energy absorbed by a human body may increase when transceiver output power increases, when transmission duty cycle increases (because SAR is related to total energy absorbed per unit time), and/or when the separation distance decreases. Further, in the design of wireless devices, it is desirable to keep the development cycle as short as possible and to minimize the cost of development. These constraints suggest that complex antenna redesigns or other complex hardware redesigns to meet SAR requirements are undesirable. Consequently, one strategy for satisfying SAR compliance criteria may be to develop algorithms for reducing transceiver output power and/or reducing transmission duty cycle if a human body is in sufficient proximity of the wireless device to require adjustments to meet SAR requirements. Algorithms for reducing duty cycle or transmission power may be less complex to implement than other potential systems or methods for reducing SAR.

Because SAR may be an issue only if a human being is in sufficiently close proximity to a wireless device, it may be desirable to detect the presence and relative proximity of a human being to a wireless device. Capacitive sensing may be one method for reliably detecting the presence and relative proximity of a human body to a wireless device. Capacitive sensing may be employed by positioning a capacitive sensor within a wireless device. Capacitive sensors may monitor variations in an electric field between and among capacitor electrodes in one or more capacitors, via measured changes in capacitance, to determine the presence and relative proximity of a human body to the wireless device. Further, unlike other types of sensors, such as optical, infrared, or acoustic sensors, capacitive sensors may distinguish between various objects based on their dielectric properties, which may allow capacitive sensors to differentiate human tissue from inanimate objects, such as books or a wooden table, based on the human body's dielectric properties. The terms "capacitive sensor" and "capacitance sensor" may be used interchangeably.

One factor in determining whether SAR control may be desirable is whether an antenna in a wireless device is enabled. FIG. 1 is a schematic diagram of an embodiment of part of an RF transceiver circuit 100 capable of indicating whether an antenna 110 is enabled. In addition to the antenna 110, the RF transceiver circuit 100 may comprise an antenna matching circuit 115, a network matching circuit 125, ports 130 and 150, and an antenna status circuit 140 arranged as shown in FIG. 1. The RF transceiver circuit 100 may be part of a wireless transmitter, including a baseband processor and power amplifier, configured to format and transmit information via RF signals.

The antenna 110 may be any type of antenna that converts RF signals to electrical signals when in receive mode and that converts electrical signals to RF signals when in transmit mode. The antenna may be omnidirectional or directional. The antenna matching circuit 115 may be any component or circuit configured to improve the transfer efficiency of an electrical signal traveling between the antenna status circuit 140 and the antenna 110, e.g., through impedance matching. The network matching circuit 125 may be any component or circuit configured to improve the transfer efficiency of an electrical signal traveling between the antenna detection circuit 140 and RF receiver circuitry connected at port 130, e.g., through impedance matching. A "port" as used in this context may be any sort of device or material convenient for connecting one circuit to another. For example, a port may comprise a position on a wire.

The antenna status circuit 140 may be configured to determine whether the antenna 110 is enabled for emitting RF energy. The antenna status circuit 140 may comprise a direct current (DC) voltage source 141, a resistor 142, a plurality of inductors 143 and 148, an RF switch connector 144, a plurality of capacitors 145 and 147, and a ground 146. The DC voltage source 141 may be any component configured to supply a steady DC voltage to the antenna status circuit 140. The ground 146 may be any common reference point from which voltage potentials are measured in the antenna status circuit 140. The resistor 142 may be any component configured to provide electrical resistance in the antenna status circuit 140. The inductors 143 and 148 may be any circuit component configured to store energy in a magnetic field. The capacitors 145 and 147 may be any circuit component used to store energy in an electric field.

The RF switch connector 144 may be any device configured to enable or disable an electrical circuit in the antenna status circuit 140 upon actuation. When the RF switch connector 144 is in a closed state, the antenna 110 is able emit an RF signal (i.e., the antenna is enabled or switched on). On the other hand, when the RF switch connector 144 is in an open state, the antenna 110 is not able to emit an RF signal (i.e., the antenna is disabled or switched off). If a matched RF plug is applied to RF switch connector 144, it may result in RF switch connector 144 being in an open state, such that the antenna 110 is disabled. The RF signal will route to/from RF plug instead of the antenna. Without the RF plug applied, the RF switch connector 144 may be in a closed state.

The voltage measured at port 150 provides a way to determine whether the antenna 110 is switched on. If the RF switch connector 144 is in an open state, the voltage measured at port 150 is approximately equal to the voltage of the DC voltage source 141, whereas if the RF switch connector 144 is in a closed state, the voltage measured at port 150 is approximately equal to the ground 146. Thus, the voltage measured at port 150 may be useful in a SAR control algorithm because SAR control may not be necessary if the antenna is disabled, and SAR control may only be necessary if the antenna is enabled.

In other embodiments, RF switch 144 and RF plug may not present but the antenna 110 may have a ground pin in addition to RF pins. Such antennas are common in wireless devices, with examples including inverted F antennas, planar inverted F antennas, and loop antennas. An antenna status circuit may be implemented without an RF switch 144 and corresponding RF plug. In an embodiment, inductor 148 may be removed, disconnecting the DC path to ground. Capacitor 145 may be bypassed or replaced with an 0 ohm resistor, and matching circuit 115 may be redesigned to allow a DC path to an RF pin of antenna (thus to ground).

Figure 2:
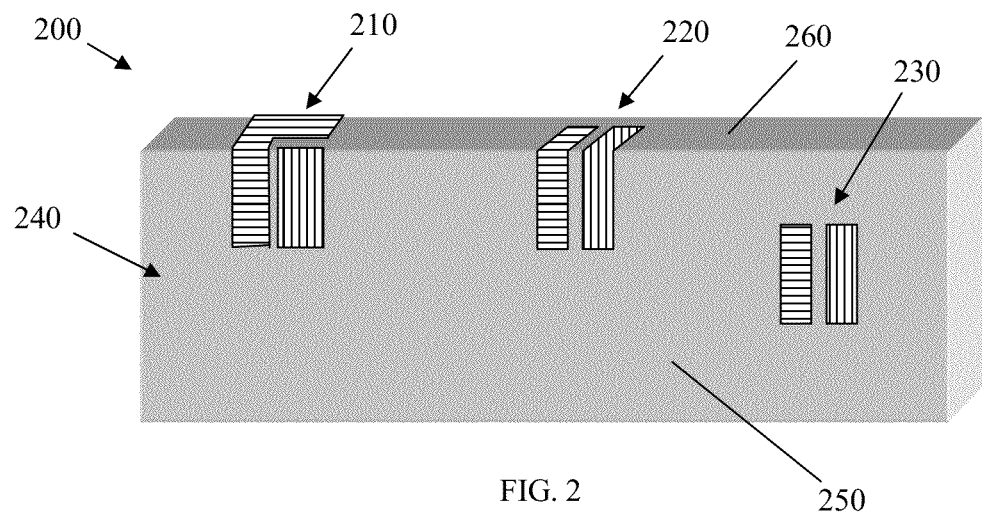
FIG. 2 is a perspective view of an embodiment of a structure comprising a plurality of capacitors.

Wireless devices may use capacitive sensors to detect the presence and proximity of a human body. Capacitive sensors may comprise one or more capacitors to assist in detecting presence and proximity. In some embodiments, one or more capacitors may be etched onto a piece of insulating material, such as material used in printed circuit boards (PCBs) or flexible printed circuit board (FPC). FIG. 2 is a perspective view of an embodiment of a structure 200 comprising a plurality of capacitors 210, 220, 230. The capacitors 210, 220, 230 may be attached to a block of insulating material 240. The capacitors may reside on different surfaces of insulating material. For example, capacitors 210 and 220 are attached to surfaces 250 and 260, and capacitor 230 is attached to surface 250. The structure 200 may be part of a capacitive sensor, which may be placed inside a wireless device, and the surfaces 250 and 260 may be aligned with surfaces of the wireless device. Capacitors may generally be of a single-ended type, which comprises only one electrode, or may be of a differential type, which comprises two electrodes. For example, capacitor 210 comprises two electrodes (illustrated using patterns) separated by air and/or insulating material 240.

Figure 3:
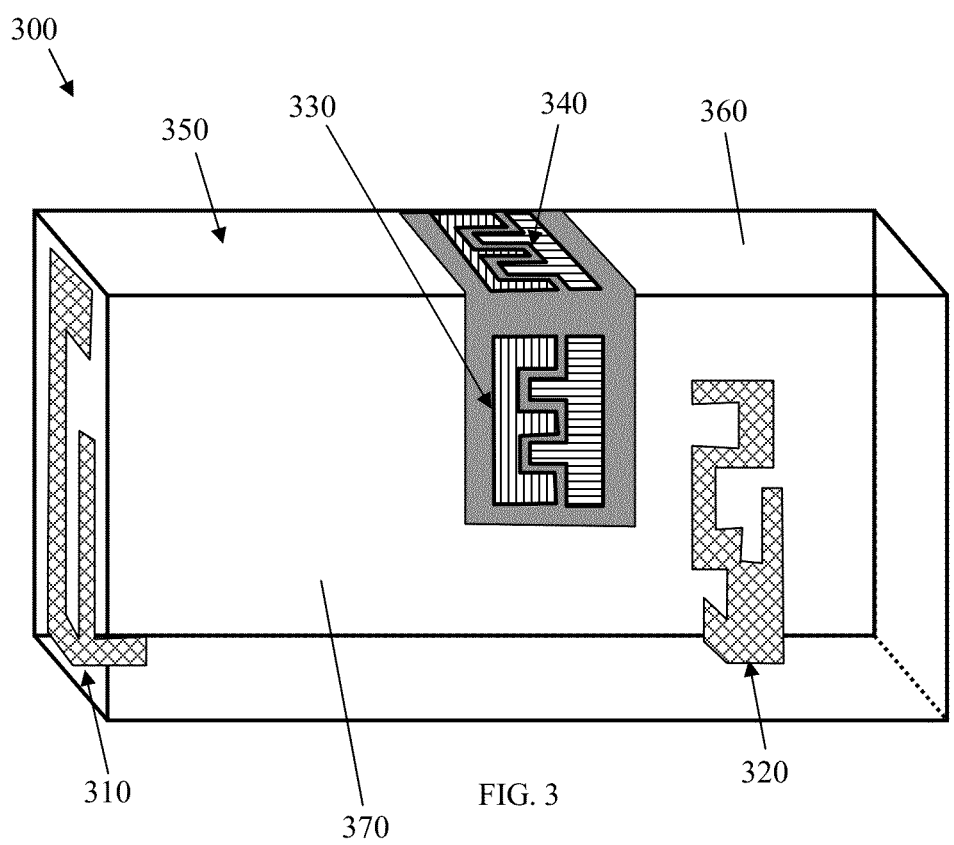
FIG. 3 is a perspective view of an embodiment of another structure comprising a plurality of capacitors.

The electrodes used in capacitors may be any shape, as further shown in FIG. 3 by the perspective view of an embodiment of another structure 300 comprising a plurality of capacitors 330 and 340. The structure 300 may comprise a first antenna 310, a second antenna 320, a first capacitor 330, and a second capacitor 340 attached to insulating material 350 as shown in FIG. 3. The structure 300 may be part of a data card or other wireless communication device configured for proximity detection. The first antenna 310 and/or the second antenna 320 may be similar to the antenna 110 discussed above in that antennas 310 and 320 may transmit RF signals for the purpose of establishing a wireless connection. The first antenna 310 and the second antenna 320 may transmit signals independently of one another or in a cooperative manner and may transmit signals via one antenna at a time or simultaneously. In general, a wireless device may comprise any number of antennas, and the wireless device may transmit via any antenna independently of the other antennas or in a cooperative manner and may transmit signals via any number of antennas simultaneously or via only a single antenna.

The first capacitor 330 and the second capacitor 340 may be strategically located on the structure 300, and the structure 300 may reside inside a form factor of a wireless communication device, such as a smart phone, to allow reasonably accurate and/or meaningful human presence and proximity detection. For instance, the positioning of the first capacitor 330 and the second capacitor 340 may provide relatively good proximity detection with respect to surfaces of a wireless communication device aligned with surfaces 360 and 370.

In an embodiment, measurements of capacitance of a plurality of capacitors, such as first capacitor 330 and second capacitor 340 in FIG. 3, may be used to determine the presence and estimate the proximity of a human body to a wireless device, which contains structure 300 in FIG. 3. Standard test methods for measuring capacitance of each capacitor may be employed. For example, a capacitance-to-digital converter (CDC) may be employed to measure capacitance of one or more capacitors and produce one or more outputs that can be read by a processor. The presence of a human body may change capacitance of a capacitor by altering the electric field generated by a voltage applied to the capacitor, which results in a change of capacitance.

An experimental procedure may be carried out using a human body phantom (i.e., a simulated human) of the type conventionally used to measure SAR. Conventional procedures for measuring SAR may use a phantom of a human head, which simulates human tissue. A wireless device is positioned relative to a phantom and a SAR value is determined for that position. The SAR value may be determined, for example, by moving a tip of a SAR probe around inside the phantom and using the resulting measurements to determine a volume-averaged SAR. A wireless device may be placed in a variety of environments, orientations, and positions relative to a human body phantom used to measure SAR. For example, a phantom may be placed at a specified separation distance (e.g., 5 mm) from a "face" of the wireless device. A face may also be referred to as a surface, and, by way of illustrative example, a cube has six faces or surfaces. At a given position where SAR is measured, capacitance values of capacitors in the capacitive sensor within the wireless device may be measured and associated with a position and a closest surface of the wireless device relative to the phantom.

Figure 4:
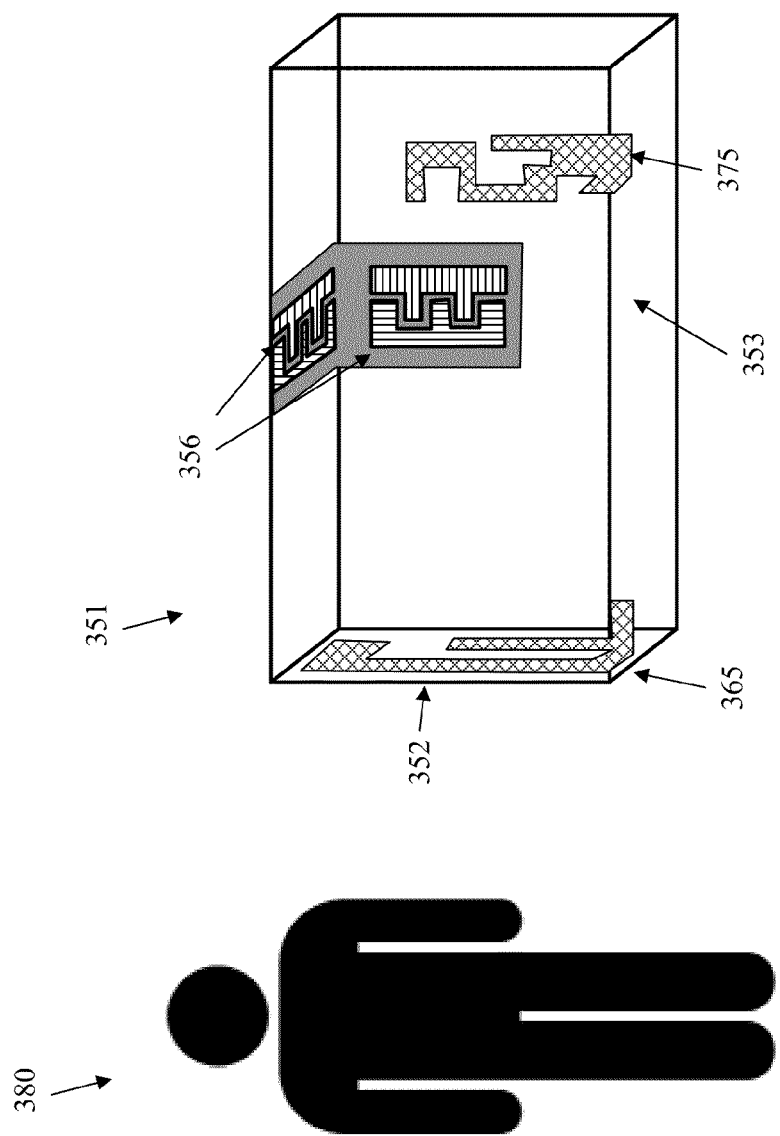
FIG. 4 illustrates a diagram of a wireless device in proximity to a human body.

FIG. 4 illustrates a wireless device 351 in proximity to a human body 380. The wireless device 351 may comprise a primary antenna 365 located on a first face 352 and a secondary antenna 375 located on a second face 353, as well as two or more capacitance sensors 356. In an embodiment, the primary antenna 365, the secondary antenna 375, and the capacitance sensors 356 may be configured similarly to the first antenna 310, the second antenna 320, and the capacitance sensors 330/340 of the structure 300. As discussed herein, capacitance sensors 356 may be positioned strategically on the wireless device such that they may gather appropriate capacitance data, e.g., data that enables/facilitates a determination of the human body's 380 relative proximity to the first 352 and/or the second surface 353.

Figure 5:
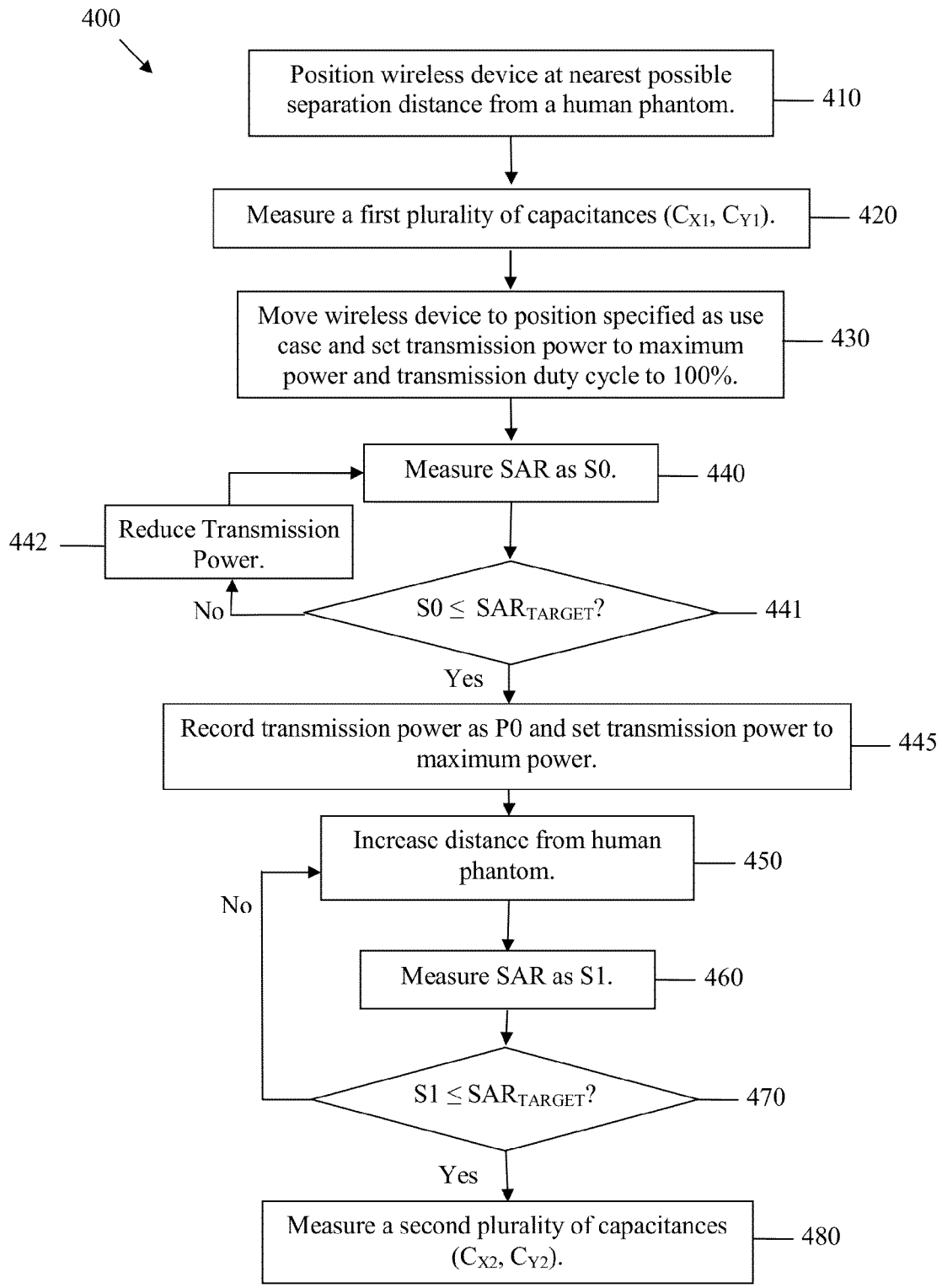
FIG. 5 is a flowchart of an embodiment of a method for determining an appropriate duty cycle and capacitance region to associate with a face of a wireless device.

FIG. 5 is a flowchart of an embodiment of a method 400 for determining an appropriate duty cycle and capacitance region to associate with a surface of a wireless device. The method 400 may apply to determine capacitance regions and associated SAR values for a wireless device with one or more antennas. The method 400 may be applied on a per-antenna basis to yield capacitance regions and associated SAR values for each antenna. In the method 400, it is assumed that two capacitors are being used for presence and proximity determination for purposes of illustration, so two capacitance values, one for each capacitor, may be measured. Alternatively, one capacitor may be used or three or more capacitors may be used for presence and proximity determination. A single capacitor may be useful to detect the presence and proximity of the human body with some accuracy, but measurements of two or more capacitors may be useful to detect the proximity with more accuracy. Accuracy of proximity measurements generally increases with the number of capacitors.

In step 410, a wireless device is positioned at a nearest possible separation distance from a human phantom. The wireless device may be oriented so that a particular surface may be nearest the human phantom. Next in step 420, a first plurality of capacitances—$C_{X1}$ and $C_{Y1}$—may be measured. Next at step 430, the wireless device is moved to a position (distance and relative orientation to phantom) as specified by one or more regulatory bodies such as the FCC (e.g., 5 mm separation between the wireless device and phantom). That is, a use case may be considered a position and orientation of a wireless device with respect to a human body. The transmission power may be set to the maximum power $P_{MAX}$ and the transmission duty cycle may be set to 100%, which represents the worst-case SAR scenario. Next at step 440, the SAR is measured at the position as S0.

Next at step 441, S0 is compared to a target SAR value $SAR_{TARGET}$, which may, for example, be a target SAR value for the use case, or, as another example, a SAR exposure limit as specified by the FCC with some design margin. If $S0 \leq SAR_{TARGET}$, the SAR control is not required for this specific configuration. If S0>SAR$_{TARGET}$, reduce the transmission power (step 442) until S0<=SAR$_{TARGET}$. Record the transmission power as P0 and reset the transmission power to maximum power in step 445. The wireless device may be moved to increase a distance from the human phantom, while keeping approximately the same orientation of the wireless device relative to the human phantom. At step 460, the SAR is measured at the position, and the value of SAR is represented as S1. At step 470, a determination is made whether S1≤SAR$_{TARGET}$. If S1 is not less than or equal to SAR$_{TARGET}$, the method returns to step 450. If S1 is less than or equal to SAR$_{TARGET}$, the method proceeds to step 480, in which a second plurality of capacitances, $C_{X2}$ and $C_{Y2}$, one for each of the two capacitors, may be measured.

The method 400 yields the following parameters, which correspond to a particular use case—P0, $C_{X1}$, $C_{Y1}$, $C_{X2}$, and $C_{Y2}$. A capacitance region may be specified based on these measurements to associate with the use case as the measured capacitance $C_1$ of a first capacitor being between $C_{X1}$ and $C_{X2}$ and the measured capacitance $C_2$ of the second capacitor being between $C_{Y1}$ and $C_{Y2}$. Stated mathematically, a region R may be specified as R={$C_1 \in (C_{X1}, C_{X2}), C_2 \in (C_{Y1}, C_{Y2})$}.

Assuming P0 is strictly less than P$_{MAX}$, the duty cycle and/or transmission power of the wireless device may be reduced so that the SAR is less than or equal to SAR$_{TARGET}$ for the proximity region. For example, the duty cycle may be set equal to P0/P$_{MAX}$, which may ensure that SAR$_{TARGET}$ is not exceeded for a use case. Alternatively, the transmission power may be reduced by a factor P0/P$_{MAX}$, which may also ensure that SAR$_{TARGET}$ is not exceeded for the use case.

For each possible use case and corresponding SAR test configuration, a set of parameters (P0, $C_{X1}$, $C_{Y1}$, $C_{X2}$, and $C_{Y2}$) may be obtained for each antenna. For wireless devices with more than one antenna, the transmission power P0 could be replaced by a vector of powers (P$_{0A}$, P$_{0B}$, ... ). The antennas may be tested while transmitting simultaneously to obtain SAR values for simultaneous transmission, or, alternatively, SAR values for simultaneous transmission may be estimated by adding SAR values from each antenna obtained while the antenna was transmitting alone. For simultaneous transmission case, in step 442, the power of one or more transmitters may be reduced, according to the priority of each transmitter and the actual design requirement.

In many data applications, wireless transmissions may be bursty, with data transmitted in short bursts followed by periods of silence. For example, in the IEEE 802.11 standards, also referred to as Wi-Fi, data transmissions, such as those related to web browsing, may be bursty. Duty cycle control may be preferable for communication systems that are configured to transmit in a bursty manner, as opposed to communication systems that are configured to transmit in a continuous or periodic manner, e.g., voice transmissions. For bursty transmissions, power backoff may be used if radio channel conditions are favorable enough that the highest-order modulation may be used even if the power is reduced. For example, in 802.11 systems, if a Received Signal Strength Indicator (RSSI) is large enough, power backoff may be used without adversely affecting throughput. As explained below, generally duty cycle control may be used when a channel quality metric is less than a threshold, and power backoff may be used when the channel quality metric exceeds a threshold.

Figure 6:
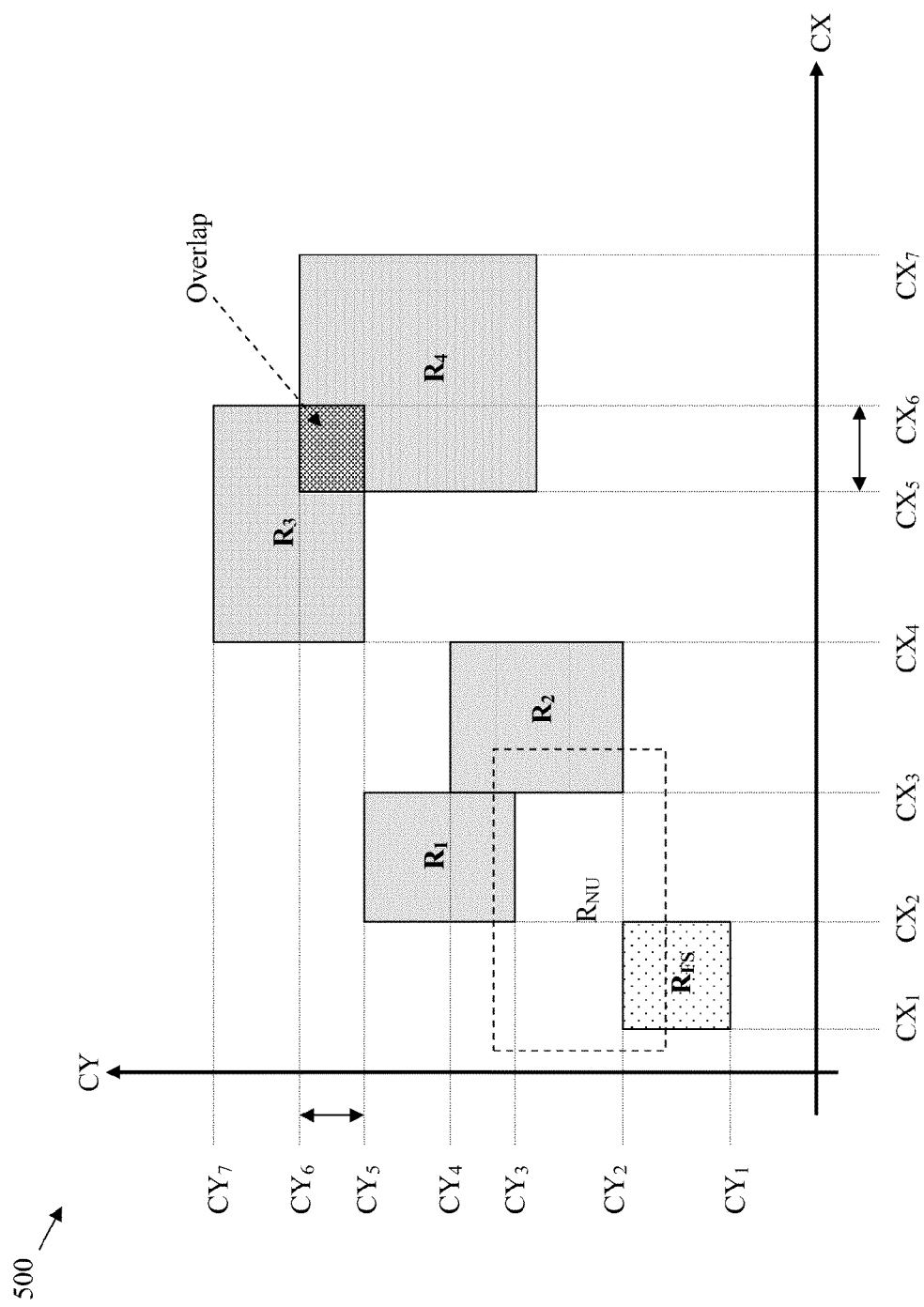
FIG. 6 is a chart of an embodiment of an example of capacitance regions corresponding to different use cases.

FIG. 6 is a chart of an embodiment of an example of capacitance regions 500 corresponding to different use cases. The x-axis of the graph indicates measured values of a first capacitor, and the y-axis of the graph indicates measured values of a second capacitor. Capacitance regions R$_1$-R$_4$ correspond to four different use cases for a wireless device, and each region may be defined by a range of capacitances of a first capacitor, indicated by values on the x-axis, and a range of values of capacitances of a second capacitor, indicated by values on the y-axis. Capacitance regions R$_1$-R$_4$ may, for example, correspond to use cases for an orientation of the wireless device relative to a human body (e.g., a user) with respect to four different surfaces of the wireless device. If the wireless device is a smart phone, for example, one of the surfaces may be a surface comprising a touch screen, and region R$_1$, for example, may indicate the proximity of a human body to the touch screen.

The capacitance region R$_{FS}$ corresponds to the case in which the wireless device essentially resides in free space, i.e., any objects that may be in the vicinity of the device have a negligible effect on measured capacitance. The capacitance region R$_{FS}$ for this case may be determined by placing the wireless device in various configurations, such as a USB dongle placed in various laptops and different USB slots. Multiple measurements at each position may be taken and averaged to generate the results. The capacitance region R$_{FS}$ may be defined by $C_{X1}$, $C_{X2}$, $C_{Y1}$, and $C_{Y2}$, which are obtained as a result of measurements. The duty cycle should be 100% and the transmission power should be the maximum power if a device operates in this region as the measured capacitances indicate that no human body may be present and so SAR should not be an issue.

The capacitance region R$_{NU}$ corresponds to "normal usage" of a wireless device, and, in an ideal configuration, would be the same region as R$_{FS}$. However, variations between R$_{NU}$ and RFS may exist. For example, a normal usage may include a wireless router placed on a wooden desk, or a data card rotated to a position close to a liquid crystal display.

There may also be overlapping between R$_{NU}$ and user cases, such as R$_1$-R$_4$. If there is significant overlapping between R$_{NU}$ and user cases, such as R$_1$-R$_4$, the capacitive sensors may need to be repositioned relative to one another within the wireless device to reduce overlapping.

Each of the regions R$_1$-R$_4$ may be created by following the steps in method 400 and will have an associated duty cycle and power backoff, one of which may be used depending on channel conditions. Some of the regions may overlap each other. For example, regions R$_3$ and R$_4$ overlap as indicated in FIG. 6. Overlapping regions represent ambiguity in the determination of user case from measured capacitance values. For example, if measured capacitance is in the overlap region in FIG. 6, it is difficult to determine which of the two regions R$_3$ or R$_4$ apply. If two or more regions overlap each other, the lowest duty cycle and power backoff from the different regions should be associated with the overlapped region. The lowest duty cycle may be selected because the lowest duty cycle would result in the lowest SAR value, which ensures that SAR requirements may be met, no matter which of the different user cases corresponding to the different regions occur. Alternatively, if the channel conditions are favorable enough, the highest power backoff corresponding to the different overlapped regions may be selected, which would result in the lowest SAR value.

Once the different capacitance regions and corresponding duty cycles and power backoffs are determined via the empirical procedure described above, the regions and corresponding duty cycles/power backoffs may be loaded into static memory in a wireless device as a table or database of information. This information may be employed in the embodiment of a method 600 for adjusting duty cycle and transmit power of a wireless device, which is shown as a flowchart in FIG. 7. The method 600 applies to transmission via a single antenna, a situation that may occur in wireless devices that have only one antenna or in wireless devices with multiple antennas that choose to use only one of the antennas for a transmission. A procedure for adjusting transmission duty cycle and power backoff for two or more antennas transmitting simultaneously may be more complex and such a procedure is discussed later.

The method 600 begins in step 610 and returns to step 610 at the end of each "control period." The duration of the control period may be selected to be as short as possible so as to not be as noticeable to a user, and the duration should be no longer than an amount of time used to determine a SAR value during SAR testing. The steps of the method 600 select a duty cycle and power level for each control period as follows. In step 610, the device state and the proximity to a human body may be determined. The device state may include, for example, whether an antenna is enabled, whether the phone is in an open or closed state (if the device is a flip phone), and/or whether a keyboard is in a sliding position (if the device has a sliding keyboard). Antenna status may, for example, be determined using antenna status circuit 140 as illustrated in FIG. 1 and described earlier. The determination of a proximity to a human body includes determining whether a human body is present nearby and, if so, determining a distance between the device and the human body and positioning of the human body relative to the device (e.g., identifying a use case). These determinations may be made using measurements of capacitances in a capacitive sensor. For example, if two capacitors are used, measurements can be compared against capacitance regions, such as in FIG. 6, and the transmission duty cycle associated with a capacitance region may be selected.

Next in step 615, a determination may be made whether SAR control is required. The determination may be based on device state information determined in step 610. For example, if it is determined that the antenna is disabled in step 610, SAR control is not required. As another example, if it is determined that the measured capacitance lies in capacitance region $R_{FS}$, as illustrated in FIG. 6, for example, SAR control may not be required because the device is estimated to reside in free space. However, if it is determined in step 610 that the measured capacitance lies in capacitance region $R_1$, as illustrated in FIG. 6, for example, a human body may be estimated to be nearby and thus SAR control in the form of duty cycle control of power backoff may be desirable.

If a determination is made in step 615 that SAR control is required, a determination is made in step 625 whether a channel quality metric is less than a threshold. The channel quality metric may be received signal strength, which is related the path loss between wireless device and base station/access point, or SNR/SNIR, an estimate of signal-to-noise ratio or signal-to-noise-plus-interference ratio, or any other metric that provides an indication of favorability of channel conditions between the wireless device and an intended receiver. The channel quality metric may be monitored in an ongoing basis, such as once per control period. Essentially, if channel conditions are favorable enough as determined in step 625, power backoff may be employed in steps 665-680. Otherwise, transmission duty cycle control may be employed in steps 630-660. To avoid frequently switching between power backoff and transmission duty cycle control, a hysteresis may be implemented. For example, multiple channel quality metric thresholds may be used so that once transmission duty cycle control is selected, it may be more difficult to select power backoff in the next iteration, and vice versa. The following example provides one illustration. In one iteration of method 600, if a channel quality metric is less than a first threshold, transmission duty cycle control may be employed in steps 630-660. In the next iteration, a second threshold may be used that is higher than the first threshold. This would ensure that it is more likely that transmission duty cycle control would be applied in a second iteration as opposed to power backoff. A similar procedure with two thresholds may be used if power backoff is selected in a first iteration to ensure that it is more likely that power backoff is selected in subsequent iterations.

If a determination is made in step 625 that the channel quality metric is less than a threshold, the method 600 proceeds to step 630 in which a transmission time quota is determined on the basis of estimated human proximity and device state as determined in step 610. A transmission time quota may be determined by multiplying a duty cycle by the control period.

Next in step 635, a timer may be started and a transmission time counter may be initialized. The transmission time counter may compute a running total of how much time the antenna has been transmitting, and the timer may keep track of a running total of time. In step 640, the transmission time counter keeps track of how much time the antenna is transmitting data. In decision block 645, a determination is made whether the timer has expired. If the timer has expired, which implies the control period has ended, the method 600 starts over at step 610. If the time has not expired, the method 600 moves to decision block 650 in which a determination is made whether the transmission time quota is exceeded.

If the transmission time quota is exceeded, transmission is prohibited for the remainder of the control period in steps 655 and 660. There may be two implementations in which prohibiting transmission in step 655 may be accomplished. In a first implementation, data throttling may be employed. For example, the rate at which data is accepted from a data queue may be reduced sufficiently to guarantee that data transmission may be prohibited for a period of time sufficient to achieve the target duty cycle. In data throttling, the data rate may be reduced without dropping packets. In a second implementation, a control signal may be used to force the transmitter off even if a receiver is expecting data from the transmitter. Data packets scheduled for transmission during "off" periods would be skipped. Such an implementation could result in data packet loss which may be recovered by, for example, a retransmission scheme, such as a hybrid automatic repeat request scheme. Existing communication standards may be used to implement the second implementation. For example, IEEE 802.11 a/b/g/n implements a power saving mode, which can be used to configure the transceiver to transmit only a portion of the time. In High Speed Uplink Packet Access (HSUPA), Evolved High Speed Access (HSPA+), and Long Term Evolution (LTE) systems, discontinuous transmission may be defined and can be configured for the wireless device. By modifying low-level software and using standard features of communication standards, proper notification may be sent to the receiving device of the communication strategy so as to avoid packet loss and retransmission. If the timer in step 660 expires, which implies the control period has ended, the method 600 starts over at step 610.

Returning to step 615, if SAR control is not required, the method 600 continues at step 620, in which transmissions are allowed using a duty cycle of 100% for the duration of a control period. When the control period ends, the process starts over at step 610.

Returning to step 625, if the channel quality metric exceeds a threshold, the method 600 proceeds to step 665 in which a transmission power backoff is determined on the basis of estimated human proximity and device state as determined in step 610. In step 670, a timer may be started. Next in step 675, the wireless device transmits any available data at the selected power level. In decision block 680, a determination is made whether the timer has expired. If not, the wireless device continues to transmit at the selected power level. If the timer has expired, which implies the control period has ended, the process starts over at step 610.

For systems with multiple antennas that may transmit simultaneously, a method for selecting duty cycle and power backoff may be more complex. For example, if one antenna transmits a first type of traffic (e.g., voice) and a second antenna transmits a second type of traffic (e.g., data), one type of traffic may be prioritized over another in controlling SAR, in which case the lower priority traffic may be transmitted at a lower power level or lower duty cycle than the higher priority traffic in order to satisfy SAR requirements. If both antennas cooperatively transmit a particular type of traffic (e.g., multiple-input-multiple-output data transmission), the power levels or duty cycle of each antenna may be set to the same values.

The method 600 may not explicitly account for time slots reserved for signaling or reference signal transmissions in the calculation of duty cycle. For example, systems implemented according to certain telecommunication standards, such as HSPA+ and LTE, use synchronous transmissions with certain frames and/or subframes (referred to generically as timeslots) reserved for signaling, reference, and/or control transmissions. The wireless device may be required to transmit information during reserved timeslots. In such systems, the timers and control periods may be synchronized with system clock and/or system frame boundaries. Reserved transmissions may be allowed regardless of whether the transmission time quota is exceeded. Alternatively, a transmission duty cycle control may take into account these required transmissions by, for example, adding the transmission time for reserved transmissions to the accumulated transmission time before the reserved transmission takes place so that the algorithm makes room for reserved transmissions by preemptively blocking non-reserved transmissions. In this manner, the method 600 may accommodate synchronous and asynchronous systems and time periods with and without reserved transmissions.

Figure 8:
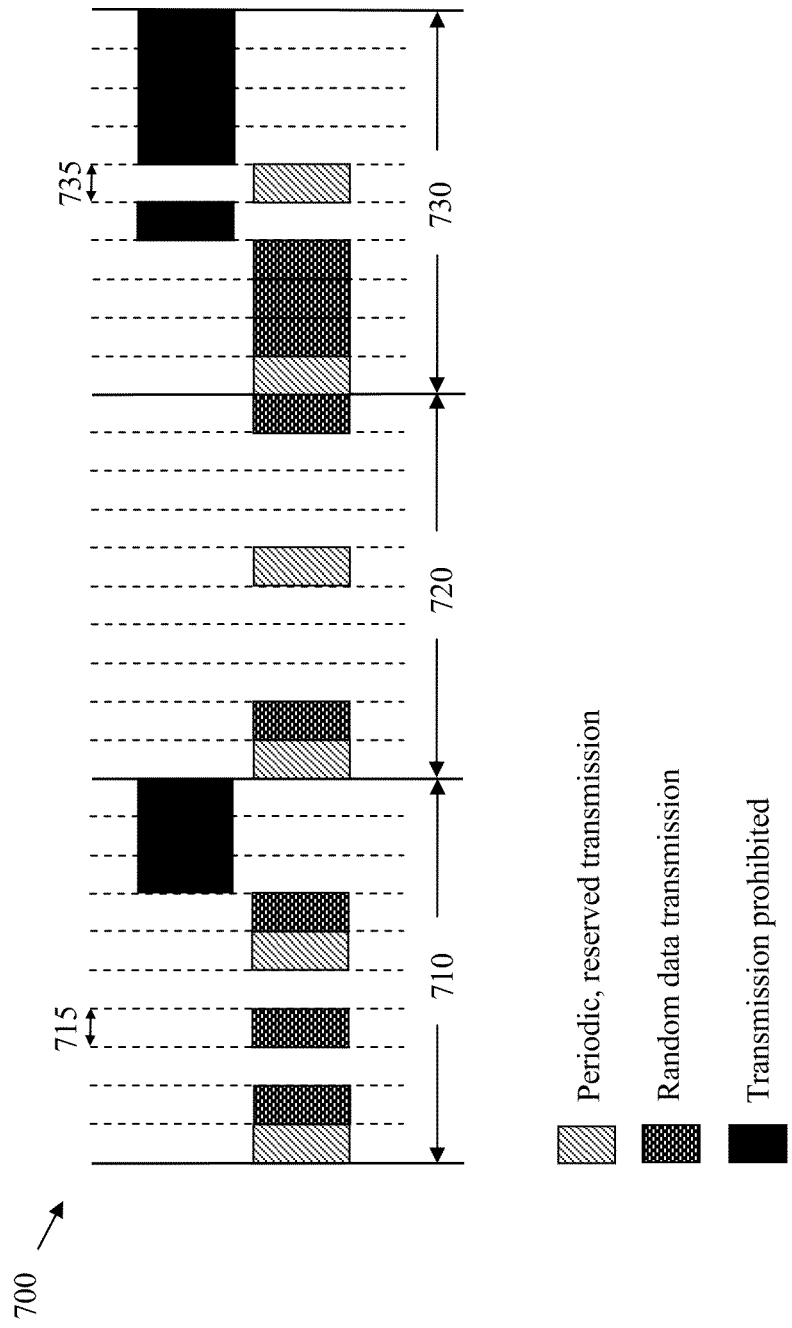
FIG. 8 is a timing diagram of an embodiment of transmissions in a synchronous communication system.

FIG. 8 is a timing diagram 700 of an embodiment of transmissions in a synchronous communication system, which has periodic, reserved transmissions. The timing diagram illustrates transmission duty cycle control in a case with a target 50% duty cycle. In the diagram, there are two types of transmissions—one type involves periodic, reserved transmissions that are required for proper system operation, and the second type involves random data transmissions. Periodic, reserved transmissions may comprise system information or control information. Time durations corresponding to a fixed frame or subframe comprising ten timeslots are illustrated. Three frames/subframes are illustrated as 710, 720, and 730. Timeslot 715 is an example of a random data transmission and timeslot 735 is an example of a periodic, reserved transmission. A 50% duty cycle corresponds to transmissions during five of the ten timeslots per frame/subframe. Periodic, reserved transmissions may take place every five timeslots by design in this example, and the first and fifth timeslots in each frame/subframe may be reserved for periodic, reserved transmissions such as control transmissions in this example In a first frame/subframe 710, transmission is prohibited after the third random data transmission because the quota of five timeslots is reached (two slots for periodic, reserved transmissions and three slots for random data). Data may be queued or dropped during a prohibition period. In a second frame/subframe 720 it does not become necessary to prohibit transmission because the quota of five timeslots is never reached (there are two slots for periodic, reserved transmissions and only two slots of random data). Any data that was queued during the first frame/subframe 710 may be transmitted during the second frame/subframe 720. In a third frame/subframe 730, transmission of random data is prohibited after the fourth timeslot because it may be anticipated that there is one additional periodic, reserved transmission that must take place in timeslot 735, which gives a total of transmissions in five timeslots (two slots for periodic, reserved transmissions and three slots for random data). Any data available for the fifth timeslot is preemptively blocked to make room for the periodic, reserved transmissions in the sixth timeslot of frame/subframe 730. Alternatively, in some applications data may be allowed to be transmitted in place of periodic, reserved transmissions, such as control transmissions, during timeslots reserved for control transmissions (e.g., first and fifth timeslots in each frame/subframe in FIG. 8).

Figure 9:
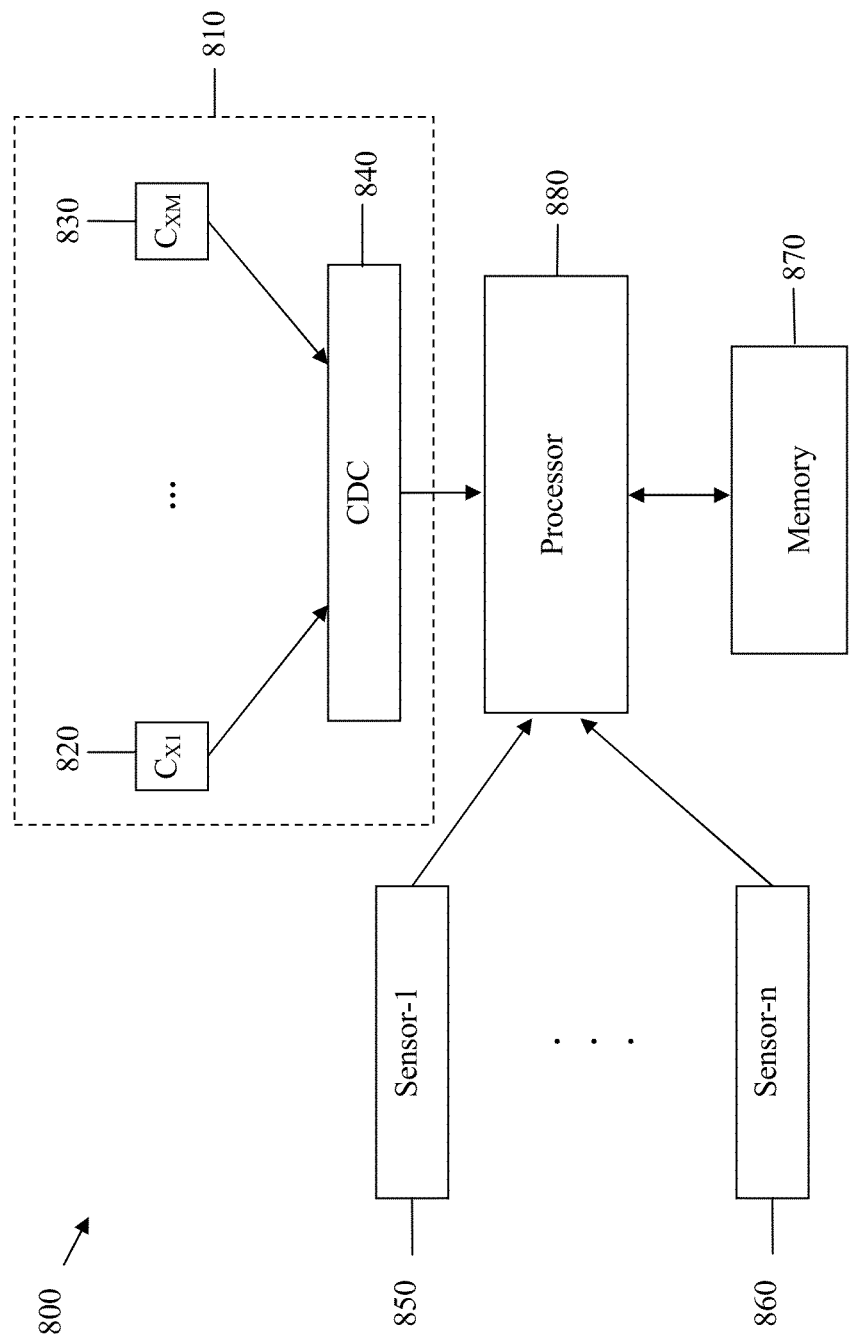
FIG. 9 is a schematic diagram an embodiment of a system for providing proximity detection in a wireless device.

FIG. 9 is a schematic diagram of an embodiment of a system 800 for providing proximity detection in a wireless device. The system 800 includes a capacitive sensor 810 comprising m capacitors $C_{X1}$ 820 through $C_{XM}$ 830, where m is an integer, and a CDC 840 that measures analog capacitances and outputs measured capacitances in digital form.

The system also includes n sensors, labeled as Sensor-1 850 through Sensor-n 860, where n is an integer. The sensors may be implemented in hardware and/or software, and may be used for determining information about the wireless device, such as whether one or more antennas are enabled (for example, using one or more antenna status circuits such as antenna status circuit 140 in FIG. 1). The sensors 850 through 860 may also determine whether the phone is in an open or closed state if the device is a flip phone, and/or whether a keyboard is in a sliding position if the device has a sliding keyboard, and/or the channel quality metric, such as signal-to-noise ratio or RSSI, used in the method 600 in FIG. 7.

Figure 7:
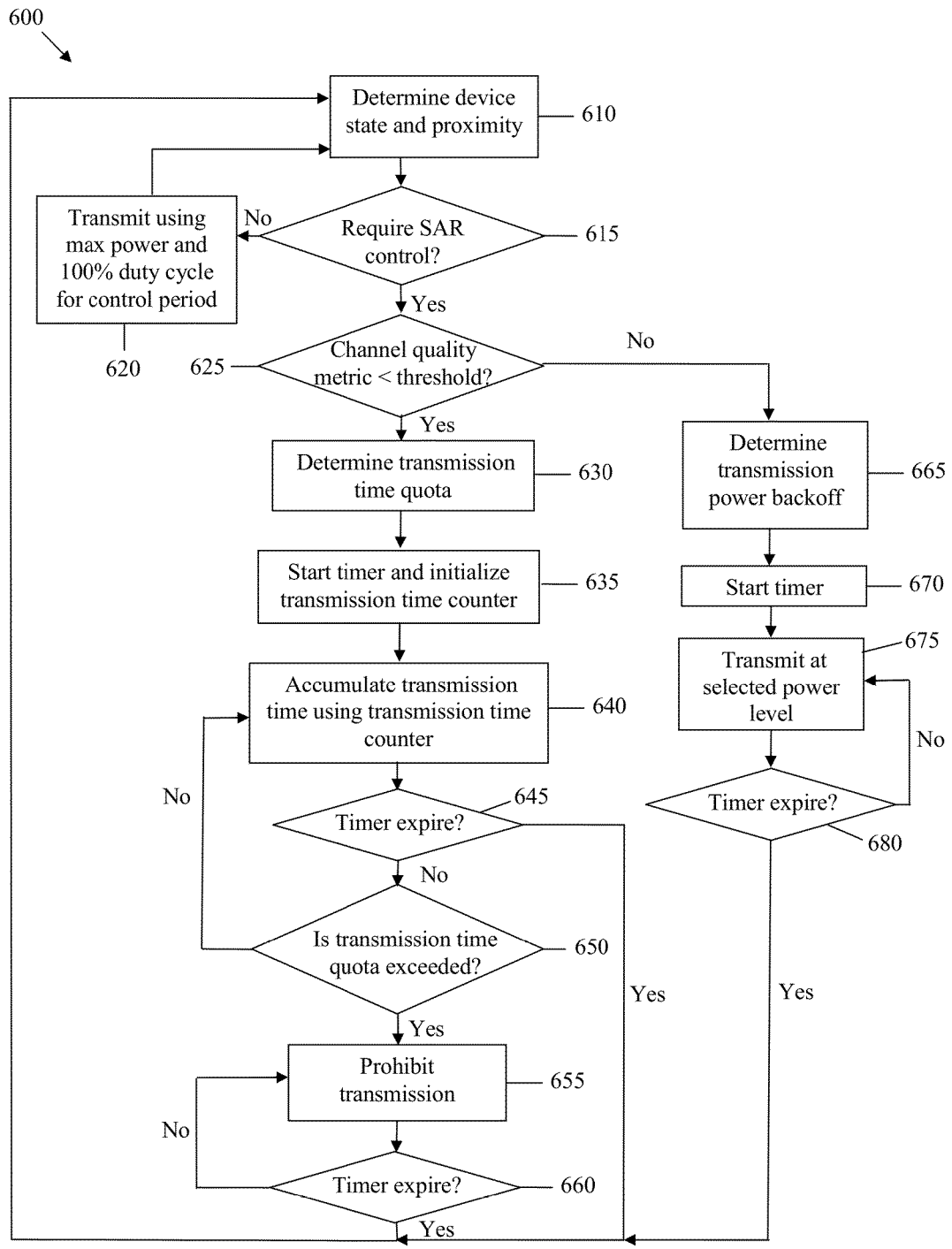
FIG. 7 is a flowchart of an embodiment of a method for adjusting duty cycle and transmit power of a wireless device.

One of the sensors 850-860 may be capable of determining accumulated transmission time during a period of time for a particular antenna, thereby helping to implement block 640 in FIG. 7. Without physical layer or Medium Access Control (MAC) layer modifications, transmission time may be counted based on transmitter or power amplifier enable signals from the transceiver or modem. Periodic poll of an enable signal can be used to accumulate the total transmission time, which may be easily implemented by software or hardware logic. Alternatively, with some protocol modifications, a software implementation may be possible to determine total transmission time. For example, the number, type, and length of each transmitted physical layer packet may be determined in a period of time and provided to processor 880 and/or upper protocol layers. The total transmission time may be determined based on this information.

The capacitive sensor 810 and sensors 850-860 provide inputs to processor 880, which may implement steps similar to those in method 600 in FIG. 7 for determining whether power backoff or duty cycle control may be desirable. The processor 880 may be implemented as one or more central processing unit (CPU) chips, or may be part of one or more application specific integrated circuits (ASICs). The processor 880 may access memory 870, which may store capacitance regions similar to those in FIG. 6 and associated transmission duty cycles and power backoff values, to help determine whether the transmission duty cycle or transmission power should be altered for SAR control purposes.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A wireless device for providing specific absorption rate (SAR) control comprising:
   a wireless transmitter;
   a capacitance sensor; and
   a processor coupled to the wireless transmitter and the capacitance sensor, wherein the processor is configured to:
   receive a first capacitance measurement from the capacitance sensor;
   estimate a relative proximity of a human body to the apparatus based on the first capacitance measurement;
   determine a target transmission time for the wireless transmitter within a time period based on the estimate;
   compare a channel quality metric to a threshold;
   determine a power backoff factor;
   transmit at a power level reduced from a maximum power level by the power backoff factor during the time period when the channel quality metric is greater than the threshold; and
   switch off the wireless transmitter for a portion of the time period when a transmission time of the wireless transmitter during the time period exceeds the target transmission time and the channel quality metric is less than the threshold.

2. The wireless device of claim 1, wherein the capacitance sensor is coupled to a first capacitor and a second capacitor, wherein the first capacitance measurement corresponds to the first capacitor, wherein the capacitance sensor is configured to provide a second capacitance measurement of the second capacitor to the processor, wherein the processor is further configured to receive the second capacitance measurement, and wherein estimating the relative proximity is further based on the second capacitance measurement.

3. The wireless device of claim 2, wherein the wireless transmitter comprises an antenna, wherein the apparatus further comprises an antenna status circuit configured to generate a signal indicating whether the antenna is enabled, wherein the processor is further configured to receive the signal and determine that the antenna is enabled, and wherein switching off the wireless transmitter for the portion of the time period is performed based on the determination that the antenna is enabled.

4. The wireless device of claim 3, further comprising a second wireless transmitter comprising a second antenna, wherein determining the target transmission time is further based on a priority of a first transmission via the transmitter relative to a second transmission via the second wireless transmitter, and wherein the processor is further configured to determine a second target transmission time for the second wireless transmitter based on the estimate and the priority.

5. The wireless device of claim 1, wherein the processor is further configured to:
   determine a presence of the human body relative to the apparatus based on the first capacitance measurement; and
   estimate the relative proximity and determine whether SAR control is required based on the estimate of relative proximity when the human body is determined to be present.

6. The wireless device of claim 5, further comprising a memory configured to store a table of capacitance regions and corresponding target transmission duty cycles, wherein the processor is coupled to the memory, wherein determining the target transmission time comprises using at least the first capacitance measurement to lookup a target transmission duty cycle in the table, and wherein the target transmission time equals the target transmission duty cycle multiplied by the time period.

7. A method for providing specific absorption rate (SAR) control comprising:
   receiving a first capacitance measurement of a first capacitor from a capacitance sensor, wherein the capacitance sensor is coupled to a wireless device, and wherein the wireless device comprises a wireless transmitter;
   estimating a relative proximity of a human body to the wireless device based on the first capacitance measurement;
   determining a target transmission time for the wireless transmitter within a time period based on the estimate;
   comparing a channel quality metric to a threshold;
   determining a power backoff factor;
   transmitting at a power level reduced from a maximum power level by the power backoff factor during the time period when the channel quality metric is greater than the threshold; and
   switching off the wireless transmitter for a portion of the time period when a transmission time of the wireless transmitter during the time period exceeds the target transmission time and the channel quality metric is less than the threshold.

8. The method of claim 7, further comprising receiving a second capacitance measurement of a second capacitor from the capacitance sensor, wherein estimating the relative proximity is further based on the second capacitance measurement.

9. The method of claim 8, further comprising:
   determining a presence of the human body relative to the apparatus based on the first capacitance measurement and the second capacitance measurement; and
   estimating the relative proximity and determining whether SAR control is required based on the estimate of relative proximity when the human body is determined to be present.

10. The method of claim 8, wherein the wireless transmitter comprises an antenna, wherein the method further comprises receiving a signal from an antenna detection circuit indicating that the antenna is enabled, and wherein switching off the wireless transmitter is performed based on the indication that the antenna is enabled.

11. The method of claim 10, wherein the wireless device further comprises a second wireless transmitter, wherein the second wireless transmitter comprises a second antenna, wherein determining the target transmission time is further based on a priority of a first transmission via the transmitter relative to a second transmission via the second wireless transmitter, and wherein the method further comprises determining a second target transmission time for the second wireless transmitter based on the estimate and the priority.

12. A wireless device comprising:
   a wireless transmitter;
   a capacitance sensor configured to measure a first capacitance value and a second capacitance value; and
   a processor coupled to the wireless transmitter and the capacitance sensor, wherein the processor is configured to:
      determine that a human body is proximately located near the wireless device;
      identify a first one of a plurality of proximity regions within which the human body is located based on the first capacitance value and the second capacitance value;
      monitor a transmission time of the wireless transmitter during a time period;
      compare a channel quality metric to a threshold;
      determine a power backoff factor;
      transmit at a power level reduced from a maximum power level by the power backoff factor during the time period when the channel quality metric is greater than the threshold; and
      prohibit transmission by the wireless transmitter during a portion of the time period when the transmission time exceeds a target transmission time and the channel quality metric is less than the threshold, wherein the transmission time exceeding the target transmission time does not satisfy one or more specific absorption rate (SAR) compliance criteria for humans located in the first proximity region.

13. The wireless device of claim 12, further comprising a first surface associated with the first proximity region and a second surface associated with a second one of the plurality of proximity regions.

14. The wireless device of claim 13, further comprising a memory configured to store a table of capacitance regions and corresponding transmission duty cycles, wherein the processor is coupled to the memory, wherein determining the target transmission time comprises using the first capacitance value and the second capacitance value to lookup a target transmission duty cycle in the table, and wherein the target transmission time equals the target transmission duty cycle multiplied by the time period.

15. The wireless device of claim 14, wherein a beginning and an end of the time period is synchronized with a beginning and an end, respectively, of a frame or superframe, and wherein the processor is further configured to allow a data transmission in place of a control transmission during a timeslot reserved for the control transmission.

16. The wireless device of claim 13, wherein the wireless transmitter comprises an antenna, wherein the apparatus further comprises an antenna status circuit configured to generate a signal indicating that the antenna is enabled, wherein the processor is further configured to receive the signal, and wherein prohibiting transmission by the wireless transmitter during the portion of the time period is based on the signal with the indication that the antenna is enabled.

* * * * *